(12) United States Patent
Gu

(10) Patent No.: US 11,279,422 B2
(45) Date of Patent: Mar. 22, 2022

(54) TRANSFORMABLE VEHICLE OF SEDAN AND SUV/STATION WAGON

(71) Applicant: Shuguang Gu, Calgary (CA)

(72) Inventor: Shuguang Gu, Calgary (CA)

( * ) Notice: Subject to any disclaimer, the term of this patent is extended or adjusted under 35 U.S.C. 154(b) by 122 days.

(21) Appl. No.: 16/504,779

(22) Filed: Jul. 8, 2019

(65) Prior Publication Data
US 2020/0172178 A1    Jun. 4, 2020

Related U.S. Application Data

(60) Provisional application No. 62/717,017, filed on Aug. 10, 2018.

(51) Int. Cl.
*B62D 33/08* (2006.01)
*B60J 7/00* (2006.01)
*B62D 33/02* (2006.01)
*B62D 33/04* (2006.01)
*B60J 1/18* (2006.01)

(52) U.S. Cl.
CPC ............ *B62D 33/08* (2013.01); *B60J 1/1823* (2013.01); *B60J 7/0053* (2013.01); *B62D 33/02* (2013.01); *B62D 33/04* (2013.01)

(58) Field of Classification Search
CPC ........ B62D 33/08; B62D 33/02; B62D 33/04; B62D 33/027; B62D 39/00; B62D 63/02; B60J 7/0053; B60J 1/1823; B60J 7/106; B60P 3/423; B60R 5/042
USPC ...................................................... 296/26.04
See application file for complete search history.

(56) References Cited

U.S. PATENT DOCUMENTS

| | | | | |
|---|---|---|---|---|
| 3,419,304 A * | 12/1968 | Sangimino | ........... | B62D 47/003 296/99.1 |
| 4,184,709 A * | 1/1980 | Kim | ........ | B60J 1/1823 296/146.13 |
| 4,305,614 A * | 12/1981 | Holka | ........ | B60J 5/101 16/252 |
| 6,517,135 B2 * | 2/2003 | de Gaillard | ............. | B60J 7/026 296/26.08 |
| 6,929,301 B2 * | 8/2005 | Kim | ........ | B60J 5/103 296/24.33 |
| 7,240,960 B2 * | 7/2007 | Fallis, III | ............... | B60J 7/0053 296/107.19 |
| 7,367,615 B1 * | 5/2008 | Fallis, III | ................... | B60J 1/17 296/216.01 |
| 7,566,094 B2 * | 7/2009 | Polewarczyk | ......... | B60J 1/1861 296/190.11 |

(Continued)

FOREIGN PATENT DOCUMENTS

WO    WO-9613403 A1 *    5/1996    ................ B60P 3/42

*Primary Examiner* — Pinel E Romain

(57) ABSTRACT

A new concept vehicle comprises six major components: Sedan body shell with back opening, Entity of movable roof, rear pillars, and liftable back window, Unit of foldable trunk top and tailgate, Rear side windows with glass panels, Auto track systems, and Affiliate parts. Based on a basic sedan body with rear trunk opening, the entity of movable roof, rear pillar and liftable back window moves backward or forward along the track systems, and the unit of foldable trunk top and tailgate that enclose the trunk and body back works together with rear side windows and other components to make two types of vehicle configurations of standard sedan and light SUV/station wagon (which concept can also be extended to application and configuration on a pickup truck).

11 Claims, 5 Drawing Sheets

(56) References Cited

U.S. PATENT DOCUMENTS

| | | | | |
|---|---|---|---|---|
| 8,152,230 B2* | 4/2012 | Kitayama | .............. | B60J 1/1884 |
| | | | | 296/220.01 |
| 8,167,357 B2* | 5/2012 | Kitayama | ................ | B60J 5/103 |
| | | | | 296/146.8 |
| 8,333,426 B2* | 12/2012 | Kitayama | .............. | B60J 7/0435 |
| | | | | 296/216.02 |
| 8,408,623 B1* | 4/2013 | McAuliff | ................... | B60J 7/11 |
| | | | | 296/24.33 |
| 8,419,498 B2* | 4/2013 | Furusawa | .............. | A63H 19/00 |
| | | | | 446/71 |
| 9,079,548 B1* | 7/2015 | Singer | ................... | B60P 1/6427 |
| 2008/0191507 A1* | 8/2008 | Farber | ................... | B60P 1/4421 |
| | | | | 296/57.1 |
| 2012/0139282 A1* | 6/2012 | Gu | ........................... | B60N 2/36 |
| | | | | 296/63 |
| 2020/0172178 A1* | 6/2020 | Gu | ........................ | B62D 33/04 |

* cited by examiner

TRANSFORMABLE VEHICLE OF SEDAN AND SUV/STATION WAGON

TECHNICAL FIELD AND INDUSTRIAL APPLICABILITY

This is an invention that combines all features (structures, shapes and functions) of three different types of vehicles of sedan, SUV, or station wagon into one transformable vehicle. It falls into automotive innovation field. With its contemporary concept, novel design, and environmentally friend combination, this vehicle has promising applicability in its industrial field and has convincible attraction to vehicle owners.

BACKGROUND

The contemporary passenger vehicle design can be divided into two categories by their structure and function, that is sedan and SUV or station wagon. However having a sedan you may sometimes find that you are unable to load larger items in the back trunk or make more room for travel; on other hand you have a SUV/station wagon, you just use it most of the time as a commuter car, leaving the back space wasteful and consuming more gas.

You want both features of the vehicle, but don't want two vehicles for saving space, gas and money. To accommodate the needs for either sedan or SUV/station wagon hatchback drivers, and for the benefit of owning one vehicle with two characters of uses, this article here is presenting an invention based on the above idea.

DESCRIPTION OF SPECIFICATIONS OF COMPONENTS

Figure 1:
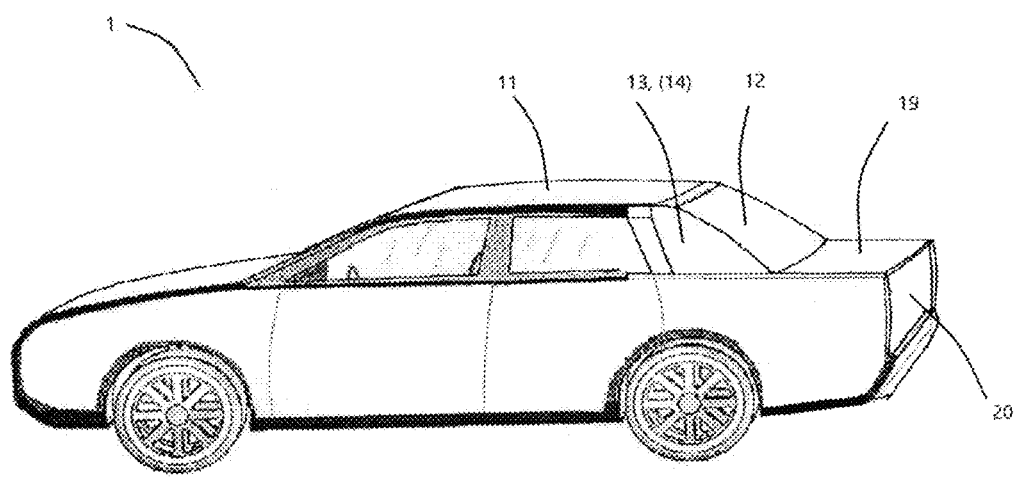
FIG. 1. Is a perspective view of Sedan configuration.
Figure 2:
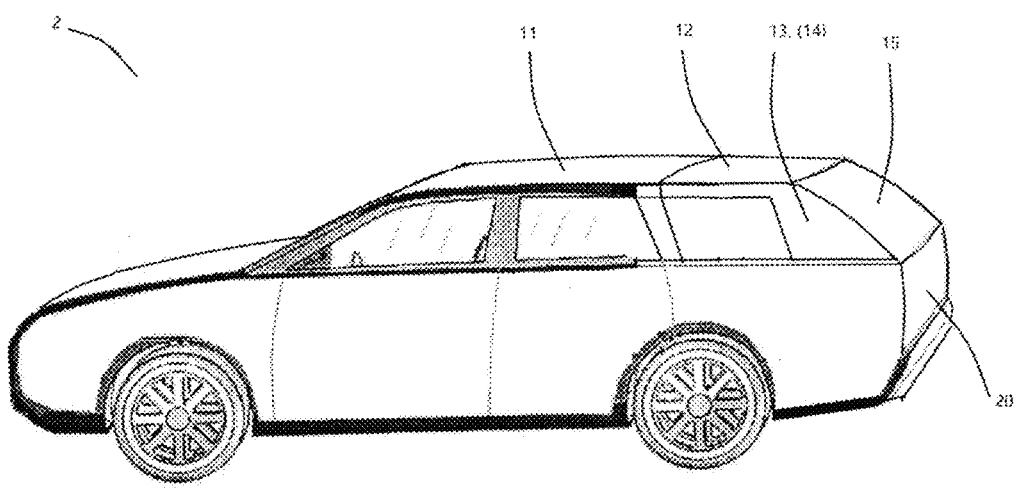
FIG. 2. Is a perspective view of SUV/Station Wagon configuration.
Figure 3:
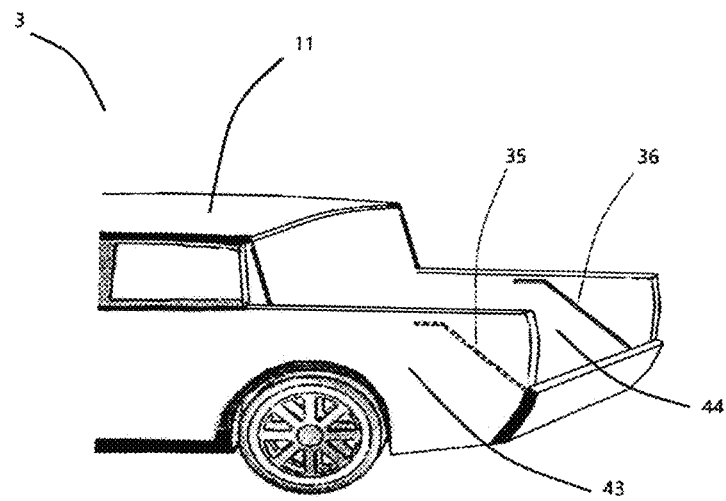
FIG. 3. Is a perspective view of a sedan based body structure that the rear portion is open like a truck bed where the rear pillars with wind shield (rear window) and the trunk top (lid) is absent. The fixed roof of cab is shown.
Figure 4:
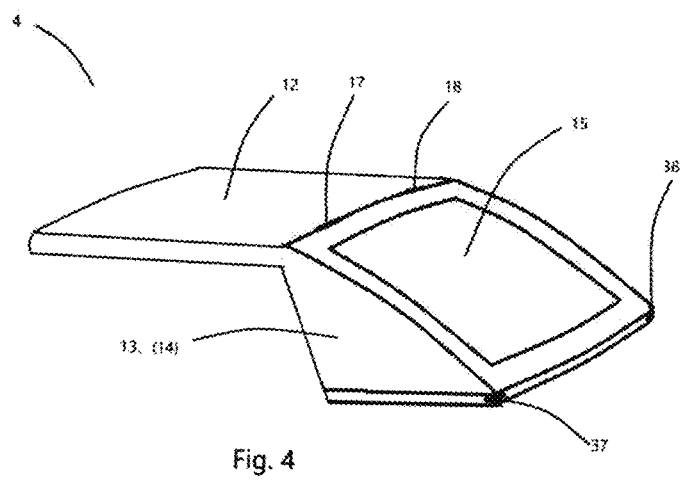
FIG. 4. Is a perspective view of entity of movable roof, rear pillars and liftable back window. The entity can be divided into front and rear portions: roof portion (the front upper portion) that is in the same shape as the roof of the sedan cab. The rear portion consists of two side triangle pillars with liftable back window in the middle.
Figure 5:
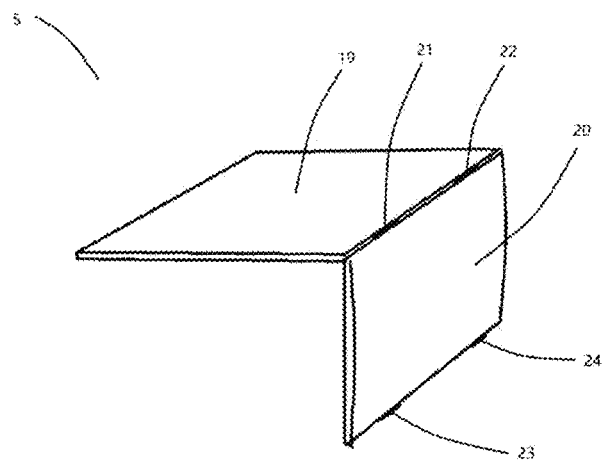
FIG. 5. Is a perspective view of the foldable unit of trunk top and tailgate. The unit consists of fordable trunk lid portion and tailgate portion that both joint by hinge device. The hinges at bottom of the tailgate will join with rear trunk bed.
Figure 6:
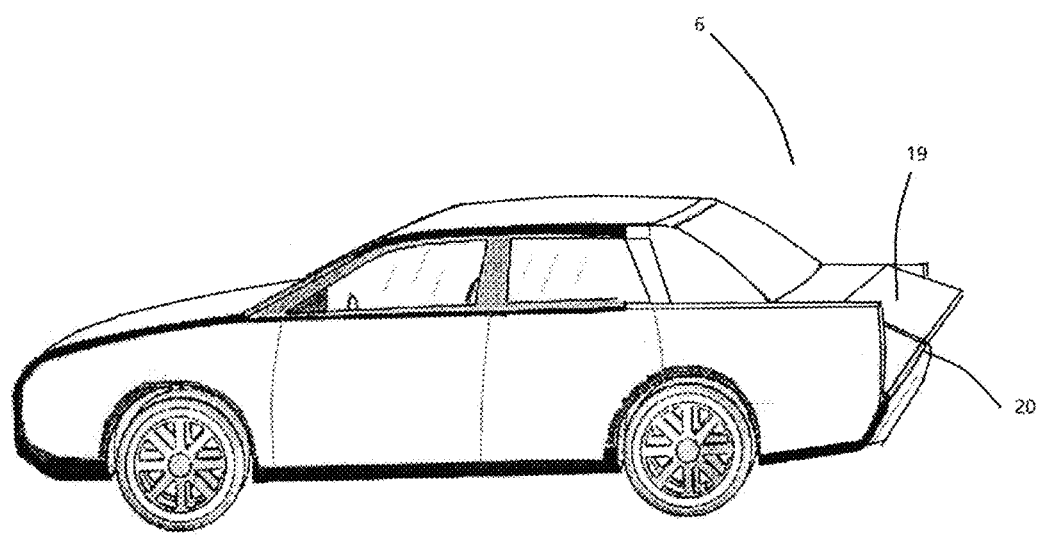
FIG. 6. Is a perspective view showing the foldable unit of trunk top and tailgate opens, moving either backwards or forwards in half way.
Figure 7:
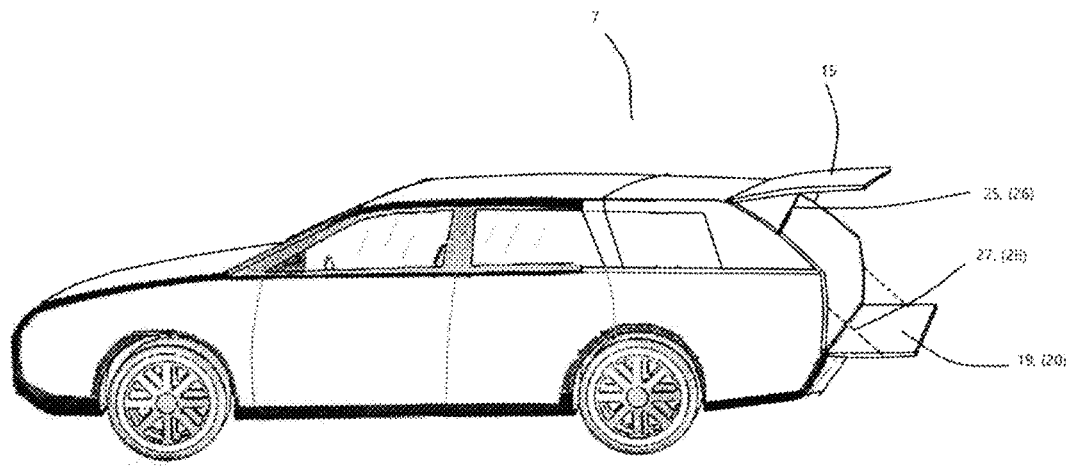
FIG. 7. Is a perspective view showing back window opens (lift up) and trunk opens (the foldable unit of trunk top and tailgate overlaps and laid down) in SUV/SW configuration. It is also the same in sedan configuration.
Figure 8:
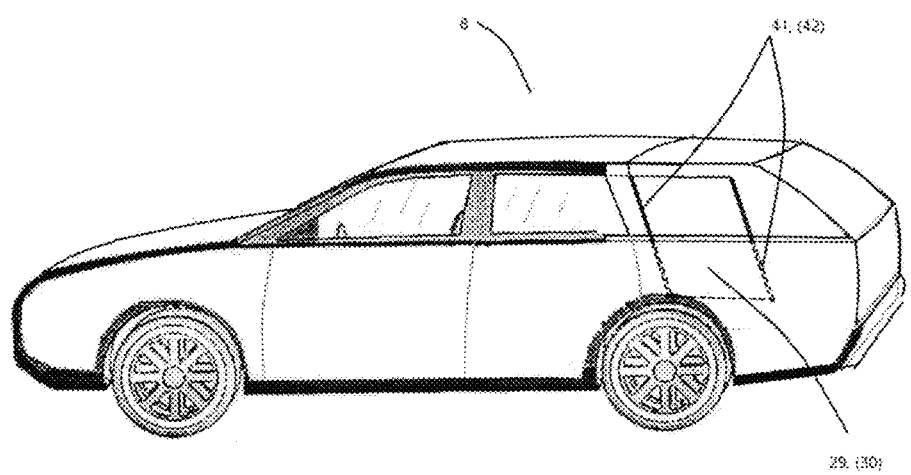
FIG. 8. Is a perspective view showing glass panel of rear side window sits inside the trunk wall. The glass panels will rise to fill and conform in parallelogram to the gap space between the movable portion in the back and fixed portion in front.

The transformable vehicle is based on a fixed sedan based body structure 3 that the rear portion is open like a truck bed where the rear pillars with wind shield (back window) and the trunk top (lid) is absent, The movable portion is an entity 4 consists of movable roof 12, rear pillars 13, 14, and liftable back window (wind shield) 15. It can be divided into front portion and rear portion. The movable roof is the front (and upper) portion, that is in the same shape as the fixed roof of the sedan cab 11, and overlaps under it when in sedan configuration 1. The two side edges of the movable roof 12 are rested and traveled in the suspension tracks 31, 32 that are fixed underneath the both side of the fixed body roof 11.

The rear portion consists of two side triangle pillars 13, 14 connected with the transverse bar, and with liftable back window 12 in between, which forms the cab back. The liftable window 12 joins the pillars transverse bar with two hinges 17, 18, and has two side locks 37, 38 between the window 12 bottom side and pillars 13, 14 that unlocks when open the window 12 to load-unload, and locks when closes for security.

Figure 9:
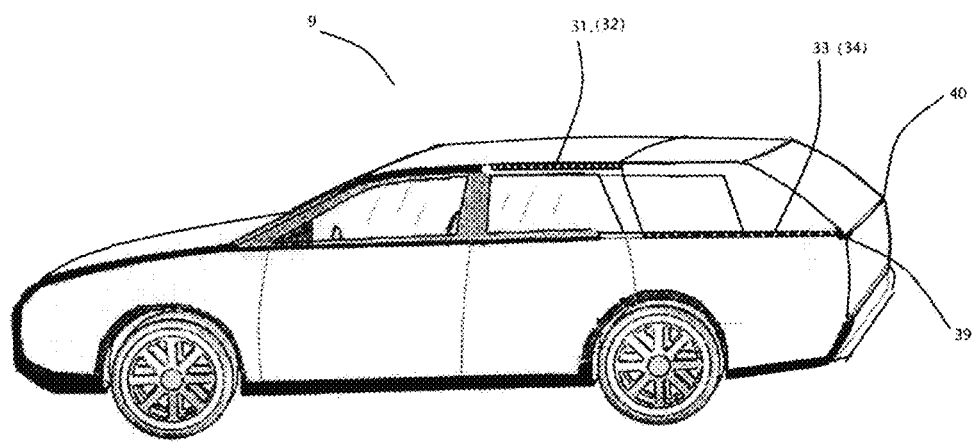
FIG. 9. Is a perspective view showing track systems at both roof side and on upper trunk wall (details of the system and motor, gear, control system are not shown).

There are two track move systems 31, 32 and 33, 34 (show on FIG. 9) that guide and move the movable entity 4. The system 31, 32 are located under both sides of the cab roof 11 that contacts the movable roof 12. The system 33, 34 are on the top of both side of trunk wall 43, 44 that contacts the rear pillars 13, 14.

The structures and locations of auto tracks system 31, 31, 33, 34 for movable portion system 4 are based on afore mentioned two locations. The movable portion 4 moves forward or backward on fixed track system 31, 32, and 33, 34, and the systems are operated by machine devices that consists of the motor, the gear part, the drive shaft, the cable connection part, the track or rail part, and electrical control part as similar as other auto move systems. The auto move systems are not shown in the figures nor discussed in detail in this patent.

The structure that covers the trunk top and back is the foldable unit 5 that consists of trunk top (lid) 19 portion and tailgate 20 portion. Both portions are joined by hinge device 21, 22. At the bottom of tailgate, there are hinges 23, 24 that connect tailgate with rear trunk bed that enable it folds down and up.

There are guide tracks 35, 36 on inside of both trunk walls 43, 44 that guide the trunk top portion 19 to move forward/backward and downward/upward. The trunk top 19 has side-joint protruding parts that engage the lid with the side tracks on the trunk wall 43, 44. The system can be operated by an auto move system. The details are nor shown on the figures, and not discussed in further detail in this patent.

There are rear side windows 8 with their glass panels 29, 30. The windows are structured the same way as normal power windows of a vehicle. They sit within the rear trunk wall 43, 44 when in sedan configuration 1. The glass panel will rise and fill in conformation with the parallelogram gap space between the vehicle's fixed portion 3 in front and the movable portion 4 in the back when in SUV/Station Wagon configuration 2.

The glass panel guide tracks 41, 42 are on the inner trunk wall 43, 44 for the lower portion and on back of fixed portion and front of movable portion for the upper portion. Each portions are met seamlessly at SUV/Station Wagon configuration 2. The windows are operated by the motors and control system that are not shown in figures nor further discussed in the patent.

While normal fuel tank neck takes position of the glass panel 29, 30, it will be relocated backwards to meet the space needs. The trunk wall 43, 44 height will also be adjusted higher accordingly to make glass panel have efficient size and have enough chamber room, The movable roof 12 side downward portion can also be lowered.

There are affiliate devices of locks, stoppers, restrain chains, and hydraulic struts that serve related portions. 1. There are one set of locks 37, 38 that are located in movable entity 4, between both side of liftable back window 15 and the pillars 13, 14 that lock the window in both sedan and SUV/station wagon position, and unlock when open the window for loading/unloading. 2. Another set of stoppers/locks 39, 40 are located between both side of tailgate and the end of trunk wall 43, 44 that stops movable entity 4 at the end position for SUV/Station Wagon configuration 2, lock the two portions in both sedan and SUV/station wagon position, and unlock when change the configuration and for loading/unloading. 3. The restrain chains 27, 28 are located between the both side of tailgate and trunks walls that limit downward movement of the tailgate and hold it in level/loading position. 4. The supporting hydraulic struts 25, 26 are located between both side of liftable back window and the pillars that support the window when it is at open position.

The author remarks that the design and structures of sealing and waterproof techniques used at joining and connection between each part are critical and will be discussed in subsequent application process.

The author also make note that rear seats of this transformable vehicle will be foldable 90 degrees in either forward or backward directions. They can be lay down flat. That way, the trunk bed can be easily used for cargo loadings, lying on back to rest when not driving, and other various uses.

Configurations:

There are two vehicle type configurations 1, 2 based on above discussed components' specifications.

a. Sedan Configuration 1, 6, 7,

The movable entity 4 (with movable roof 12 and rear pillar 13, 14) is in its original position that is tightly attached/adheres to the back of sedan body 3 opening, the roof part 12 is sit on the track 31, 32 under the cab roof (within the two layers of the cab roof), and the rear pillar 13, 14 with liftable back window 15 forms the cab back portion seamlessly. In this sedan configuration 1, the foldable trunk top 19 and tailgate 20 of foldable unit 5 is closed, with two lock sets 37, 38, and 39, 40 locked to secure the entire body back (trunk portion). Meanwhile, the glass panels 29, 30 of the rear side windows sit hidden inside the trunk wall 43, 44. To load and/or unload, release the locks 39, 40, and move the foldable unit 5 backwards and downwards along the guide track 35, 36 until it overlaps and lay down flat with restrain chains 27, 28. To lift the liftable back window 15 for larger cargos, you first unlock the lock set 37, 38, then lift it open with the support by supporting struts 25, 26. To close the trunk, you follow the above steps reversely until the unit returns to original position and relocked.

b. SUV/Station Wagon Configuration 2, 6, 7,

There are three steps of operation: First, release/unlock the lock set 39, 40, and move the foldable unit 5 backwards and downwards along the guide track 35, 36 until the trunk top 19 and tailgate 20 overlaps and then move it back to vertical position and lock it with locks 39, 40. Second, move the hen the movable entity 4 backwards along (via) the auto track system 31, 32 and 33, 34 to meet the end of the trunk wall and stops and locked by lock/stopper set 39, 40. Third, the glass panels 29, 30 of the rear side windows rise to meet the movable roof 12 portion of entity 4 until sealing the parallelogram gaps between the back of cab body 3 and entity 4. Thus the whole circle of SUV/Station Wagon configuration 2 process is completed. To open and close the trunk for loading and unloading, follow the steps the same as at sedan configuration 1 above. Please note that the second and third steps are operated by auto move systems as afore mentioned.

The two configurations let the vehicle shift between either a normal sedan or a station wagon or light SUV. It therefore accommodates the needs for either types of vehicle. Moreover, it is environmental friendly because of saving space, saving gas and money.

Although the present invention has been described with specifications and particular embodiments, various modifications, alterations, and adaptations may be made by those skilled in the art without departing from the spirit and scope of the invention set forth in the following claims.

What is claimed is:

1. A transformable vehicle that transforms between either configurations of sedan or SUV/station wagon (which concept can also be extended to application and configuration on a pickup truck) has fixed portion, movable portion and foldable portion that function (combine) together making either configuration, which comprising following major components: a sedan body shell with back (rear trunk) opening; an entity of movable roof, rear pillars, and liftable back window (wind shield); a unit of foldable trunk top and tailgate; a pair of rear side windows with glass panels; auto track/rail systems for movable portions; and affiliate devices.

2. A transformable vehicle of claim 1, wherein said a sedan based full body shell structure with a complete front components including fixed cab roof and four side doors with front and rear seats in the cab, whereas its rear portion is open like a truck bed where the rear pillars with wind shield (back window) and the trunk top are absent, being a base to accommodate the vehicle's transformable configuration components.

3. A transformable vehicle of claim 1, wherein said an entity of movable roof, rear pillars and liftable back window comprises the moving portion transforming one configuration to another; wherein the movable roof portion is in the same shape conforming to the roof of the sedan cab, and its back connecting with a transverse bar between two side triangle pillars, and within the pillars is the liftable back window which connects to the transverse bar with two hinges.

4. A movable entity of transformable vehicle of claim 3, wherein said the movable entity is guided and moves along two track move systems; the front/upper track systems are located under both sides of the cab roof that the movable roof sits and/or slides on the track of which the movement is machine operated; the rear/lower track systems are on top of both side trunk walls that the pillars' bottoms sit and/or slide on the tracks which are also machine operated.

5. A transformable vehicle of claim 1, wherein said the foldable unit of trunk top and tailgate encloses vehicle's trunk portion; wherein the trunk top portion and tailgate portion are joined by hinge device, and the tailgate portion's bottom is also joined with rear trunk bed by hinges; and wherein those devices make this foldable unit move either directions and overlap to accommodate either configurations.

6. A foldable unit of trunk top and tailgate of the transformable vehicle of claim 5, wherein said the trunk top portion is guided and slides along a guide track(s) on both inner trunk walls from upper front to lower rear, and moves either directions; the trunk top has protruding node on both side that engage the trunk top with the aforementioned guide tracks on the inner trunk walls; and the track system can optionally be operated by an auto move system.

7. A transformable vehicle of claim 1, wherein said the glass panels of rear side windows sit within the rear trunk walls when in sedan configuration, and the panels rise along the window tracks and fill a gap space(s) seamlessly between the vehicle's fixed portion in front and the movable portion in the back when in SUV/Station Wagon configuration: and the windows are operated by power window systems; wherein the vehicle's fuel tank neck position and trunk walls height are also adjusted accordingly.

8. A transformable vehicle of claim 1, wherein said the vehicle has affiliate devices to serve related portions for configuration processes in which there are: one set of locks are located in movable entity between both side of liftable back window and the pillars; another set of stoppers/locks are located between both side of tailgate and trunk walls end; there are restrain chains located between the both side of tailgate and trunks walls; and there are supporting hydraulic struts are located between both side of liftable back window and the pillars.

9. A transformable vehicle of claim 1, wherein said the vehicle has sedan configuration that is achieved as: the movable entity at its original position is tightly attached/adheres to the back of sedan body opening, the roof part is sit on the track under the cab roof and the rear pillar with liftable back window therefore forms the cab back portion seamlessly; whereas the foldable trunk top and tailgate of foldable unit is closed, with two lock sets locked to secure the entire body back (trunk portion); meanwhile, the glass panels of the rear side windows sit hidden inside the trunk wall; whereas to load or unload, release the locks and move the foldable unit backwards and downwards along the guide track until it overlaps and lay down flat with restrain chains; whereas to lift the liftable back window for larger cargos by first unlocking the lock set then lift it open with the aforementioned supporting hydrolic struts; whereas to close the trunk by following above steps reversely until the foldable unit returns to its original position and relocked.

10. A transformable vehicle of claim 1, wherein said the vehicle has SUV/Station Wagon configuration that is achieved by three steps: first to unlock the lock set and move the foldable unit backwards and downwards along the guide track aforementioned until the trunk top and tailgate overlaps and then move it back to vertical position and lock it with locks; second to move the movable entity backwards along (via) the two auto track systems until meet trunk walls end and stops and locked by lock/stopper set; third, the rear side windows' glass panels rise to meet the movable roof portion of entity until fill up a parallelogram gap(s) between the back of cab body and the entity; open and close the trunk and back window for loading and unloading, follow the same steps aforementioned for sedan configuration in claim 9.

11. A transformable vehicle of claim 1, wherein said the vehicle's rear seats are foldable 90 degrees in either forward or backward directions, so they can be lay down flat making trunk bed more space for cargo load or for passenger lying flat to rest when not driving, etc.

* * * * *